US010589206B2

(12) United States Patent
Kluge

(10) Patent No.: US 10,589,206 B2
(45) Date of Patent: Mar. 17, 2020

(54) FILTER BAG FOR POCKET AIR FILTERS

(71) Applicant: Kluge-Luftfilter GmbH, Langen (DE)

(72) Inventor: Klaus Kluge, Langen (DE)

(73) Assignee: Kluge-Luftfilter GmbH, Langen (DE)

( * ) Notice: Subject to any disclaimer, the term of this patent is extended or adjusted under 35 U.S.C. 154(b) by 127 days.

(21) Appl. No.: 15/579,491

(22) PCT Filed: May 11, 2016

(86) PCT No.: PCT/EP2016/060522
§ 371 (c)(1),
(2) Date: Dec. 4, 2017

(87) PCT Pub. No.: WO2016/180862
PCT Pub. Date: Nov. 17, 2016

(65) Prior Publication Data
US 2018/0147520 A1  May 31, 2018

(30) Foreign Application Priority Data
May 12, 2015 (DE) .......... 10 2015 107 481

(51) Int. Cl.
*B01D 46/00* (2006.01)
*B01D 46/02* (2006.01)
*B01D 46/06* (2006.01)
*A47L 9/14* (2006.01)

(52) U.S. Cl.
CPC ....... *B01D 46/023* (2013.01); *B01D 46/0001* (2013.01); *B01D 46/02* (2013.01); *B01D 46/06* (2013.01); *A47L 9/14* (2013.01); *B01D 2265/04* (2013.01)

(58) Field of Classification Search
CPC .. B01D 46/00; B01D 46/023; B01D 46/0001; B01D 46/02; B01D 46/06; B01D 2265/04; A47L 9/14–149
USPC ............ 55/361–382, 490–519, DIG. 12
See application file for complete search history.

(56) References Cited

U.S. PATENT DOCUMENTS 4,154,587 A * 5/1979 Gerok ............... B01D 46/06
                                                            55/381
5,554,203 A   9/1996 Borkent et al.
6,524,359 B1  2/2003 Kluge

FOREIGN PATENT DOCUMENTS

DE  102005035090 A1  2/2007
EP       0663228 A1  7/1995
EP      1049527 A1  11/2000
(Continued)

Primary Examiner — T. Bennett McKenzie
(74) Attorney, Agent, or Firm — Smartpat PLC

(57) ABSTRACT

A filter bag for pocket air filters has two abutting side parts which are made of an air-permeable filter material that is weldable by ultrasound. The side parts are continuously welded to one another in side edge portions on three sides of the side parts so that a pocket having two opposite side edges, a bottom edge and an opening opposite said bottom edge is formed. Several webs made from a flexible material web are formed in the pocket. The webs connect the side parts to one another and are orientated from an opening side of the filter bag in the direction of the bottom edge. The flexible material web is alternately connected—at least in portions—to one of the side parts in each case in weld portions. The weld portions are delimited by at least one weld across the direction of flow.

8 Claims, 2 Drawing Sheets

(56) References Cited

FOREIGN PATENT DOCUMENTS

WO     1999037385 A1    7/1999
WO     1999038599 A1    8/1999

\* cited by examiner

FILTER BAG FOR POCKET AIR FILTERS

TECHNICAL FIELD

The disclosure relates to a filter bag for pocket air filters.

BACKGROUND

Pocket air filters are used to clean air, where several filter bags are usually arranged at a distance from each other in the pocket air filter. In order to clean a current of air, the pocket air filter is located in the air stream in such a way that air flows through the side parts of the filter bags from the respective opening side and particles contained in the air are separated out at the side portions.

In order to achieve the best possible filter effect and to make maximum possible use of the filter area formed by the side parts, the filter bags are normally designed in such a way that the air flows evenly through the entire filter area. For this purpose, it is necessary to adjust the distance between the filter bags of a pocket air filter and, in particular, to prevent side parts of adjacent filter bags from making contact with each other, as this would severely reduce the effective filter area.

Therefore, the cross-section of conventional filter bags usually runs from the opening to the bottom edge, whereby the cross-section is continuously reduced. This is achieved by the connection between the opposing side parts of a filter bag by the webs, by which the distance between the side walls of a filter bag and, thereby indirectly, also the distance between this filter bag and a filter bag arranged adjacently in the pocket air filter, can be specified.

A manufacturing process for such filter bags is described in document EP 1 049 527 B1. In the case of the process described in this document, the filter bags are manufactured from two webs of filter material and the flexible material web. These webs run into a suitable welding unit, where the flexible material web is arranged between the filter material webs and is fed to the welding device.

The welding device has several sonotrodes, with which the filter material webs and the flexible material web can be welded together by ultrasound. In order to weld only one of the filter material webs to the flexible material web alternately, the welding device also has transferrable plates, which are arranged between the flexible material web and the filter material webs so as to be transferrable and prevent the flexible material web from being welded to the filter material web, which is separated from the flexible material web during welding by a plate. By alternately welding the flexible material web to the two filter material webs, webs are formed between the filter material webs from the flexible material of the material web.

In order to facilitate a continuously reducing distance between the side parts by the webs from the opening side to the bottom edge, it is necessary that the web portion width or web width of the web portion or webs decreases from the opening side towards the bottom edge. This is achieved by the filter bags known from the state of the art, in that adjacent welding portions, with which the flexible material web is welded in each case to one of the side parts, are more widely spaced apart on one side of the welding portions facing the opening side, than on a side facing the bottom edge.

In order also to facilitate a corresponding space between the side parts in the area of the side edges of the filter bag, it is also provided in the case of the filter bags known from the state of the art, that the side parts are developed to be trapezoidal, so that a space between the side edges and weld portions arranged in each case adjacent to the side edges, likewise decreases from the opening side towards the bottom edge. The trapezoidal development means that a web portion is also formed, which has a decreasing web portion width, as a result of the flexible material web between the outermost weld portions and the side edges, to which both side parts are welded together and to the flexible material web. The filter area available is reduced as a result of the necessarily trapezoidal design of the filter bags.

The side parts of high-quality filter bags also have a trapezoidal shape for different reasons, as for example to facilitate installation. However, an angle between the side edges or with the bottom edge is largely determined by the required cross-sectional shape of the filter bags in the condition where they are installed and air is passing through or in the installed position.

It is regarded as the task of the disclosure to provide a filter bag for pocket air filters, where the filter area available for filtering can be enlarged.

SUMMARY

A filter bag for pocket air filters with two abutting side parts, comprises an air-permeable filter material that can be welded by ultrasound. The side parts are continuously welded to one another in side edge portions on three sides of the side parts, so that a pocket having two opposite side edges, a bottom edge and an opening opposite said bottom edge is formed by two side parts that are welded together.

Several webs made from a flexible material web are formed in the pocket. The webs connect the side parts and are orientated to run from an opening side of the filter bag in the direction of the bottom edge.

The flexible material web is alternately connected, at least in some areas, to the side parts in staggered welding portions. The welding portions are delimited longitudinally in relation to the direction of flow by at least one weld seam so that the flexible material web is connected in each case exclusively to one side part in a weld portion, thereby forming a zig-zag pattern.

The webs are formed by web portions of the flexible material web. The web portions each run between two adjacent welding portions, by which the flexible material web is connected to two opposite side parts. A web portion width of the web portions, which is defined by a length of one web portion between the side parts, decreases in each case from the opening side to the bottom edge.

The filter area available for filtering can be enlarged in that a welding portion width at least of one welding portion increases in size at least in portions from the opening side in the direction of the bottom edge. Because the welding portion width increases in the direction of the bottom edge, the web portion widths of the web portion are simultaneously reduced between this welding portion and the adjacent welding portions. Therefore, the progression of the distance between the side parts from one another can be simply prescribed by the web portion width and can be adjusted irrespective of the external shape or basic area of the side parts. The variation in the web portion width, in other words, provides an additional degree of flexibility in the design of the filter bags for pocket air filters.

By varying the web portion width, it is also possible very simply to produce web portions with different web portion widths for the filter bag. In order to enable as even a progression of the portion widths as possible of the webs of the web portion, the welding portion widths of the welding portions, to which the flexible material web is welded to one of the side parts, increase in size from the opening side in the direction of the bottom edge, at least in portions. However, it is also possible that the web portion widths of all the web portions increase in size from the opening side to the bottom edge.

In the case of a particularly beneficial development of the filter bag, at least one welding portion is V-shaped, so that the welding portion width of the at least one welding portion increases in size from the opening side in the direction of the bottom edge. A V-shaped welding portion enables the web portion width to decrease continuously.

It is beneficially provided that the V-shaped welding portion is formed by a V-shaped web weld seam, so that a web weld width of the web weld seam increases in size from the opening side in the direction of the bottom edge. To produce such a V-shaped web weld seam, either correspondingly V-shaped sonotrodes can be used or the weld is produced by conventional sonotrodes with consistent weld width by applying the sonotrodes at multiple different angles when producing the weld, meaning that the V-shaped weld is produced by several welding processes.

However, it is possible that the V-shaped weld portion is formed by two web welds adjacent to each other, where the web welds are so arranged that a space between the web welds increases from the opening side in the direction of the bottom edge. This means that the V-shaped weld portion can be formed by only two web welds. In this way the production process is simplified on the one hand and, on the other, the area of the respective side part which is located between the web welds and is not welded can be used for filtering, so that the effective filter area can be further enlarged.

The use of two adjacent web welds beneficially provides that the web welds are also spaced apart towards the opening side so that inflowing air can flow directly into the area, which is formed by the flexible material web and the side part between the V-shaped web welds.

In order to achieve a linear reduction in the web portion width the weld portion width increases linearly.

An exponentially reducing course of the web portion width can be achieved in that the welding portion width exponentially increases. By varying the weld portion width virtually any progressions of the web portion widths can be prescribed.

A particularly beneficial development of the filter bag provides that the web portion width of at least one web portion decreases continuously to zero.

Because the web portion width can be almost randomly prescribed by varying the weld portion width, it is possible to adjust and prescribe the shape of the side parts independently of the desired and provided cross-sectional shape of the filter bag in its installed position. If it is necessary and sensible for the side parts to be trapezoidal in shape, for example to facilitate assembly, the angle of the side edges in relation to the bottom edge, can be prescribed accordingly, where the cross-sectional shape does not initially have to be taken into account. Therefore, the basic area of the side parts is essentially determined by the pocket air filter used and the respective installation situation. In the case of the conventional filter bags, the angles of the side parts in relation to the bottom edge are comparatively large and the effective filter area is correspondingly reduced, in order to achieve the desired cross-sectional shape. In the case of the filter bags, these angles can be considerably reduced.

In order to keep the drop in pressure above the filter bag as low as possible, the flexible material web is air-permeable. By this means, the rate of air flow through the side parts over the entire area of the side parts is largely kept constant. In the case of the flexible material web, this may be, for example, a fleece permeable to air or a large-mesh fabric.

Further beneficial developments of the filter bag are explained in greater detail by the examples shown in the drawing.

DETAILED DESCRIPTION

Figure 1:
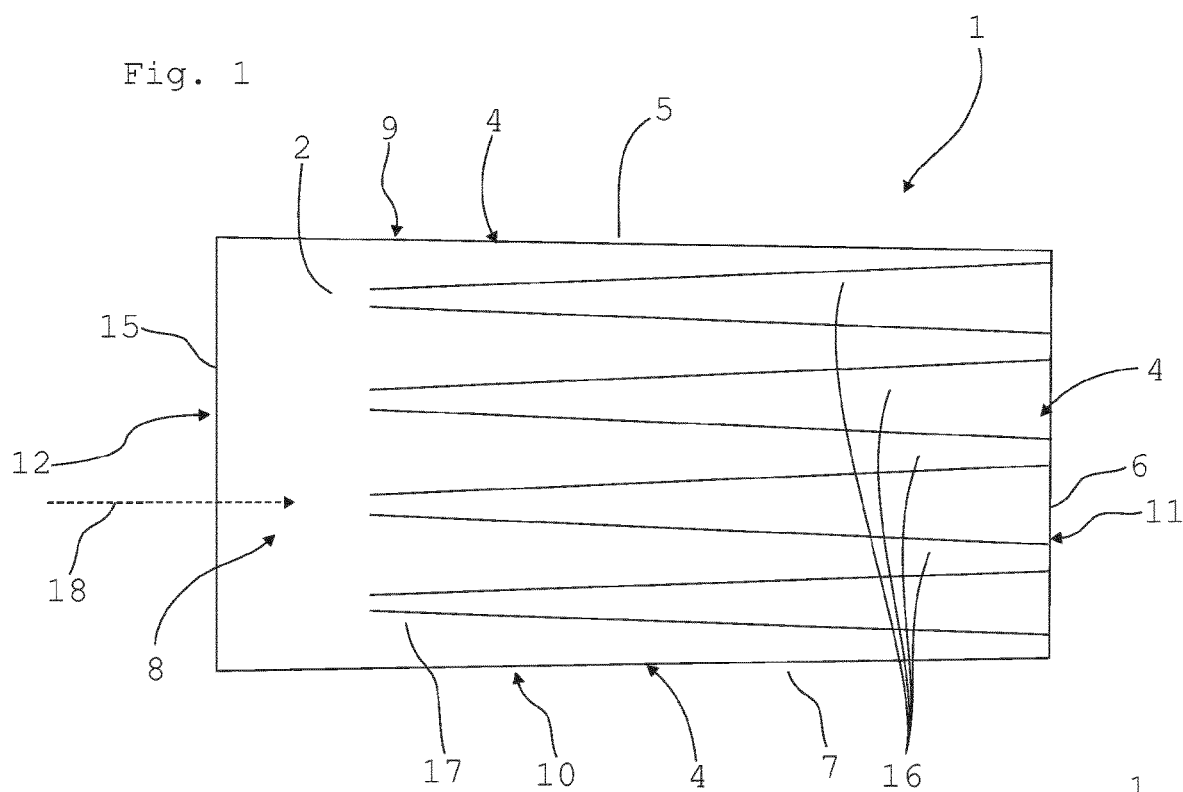
FIG. 1 shows a schematic top view of a filter bag with a V-shaped weld portion, delimited by two adjacent web welds.
Figure 2:
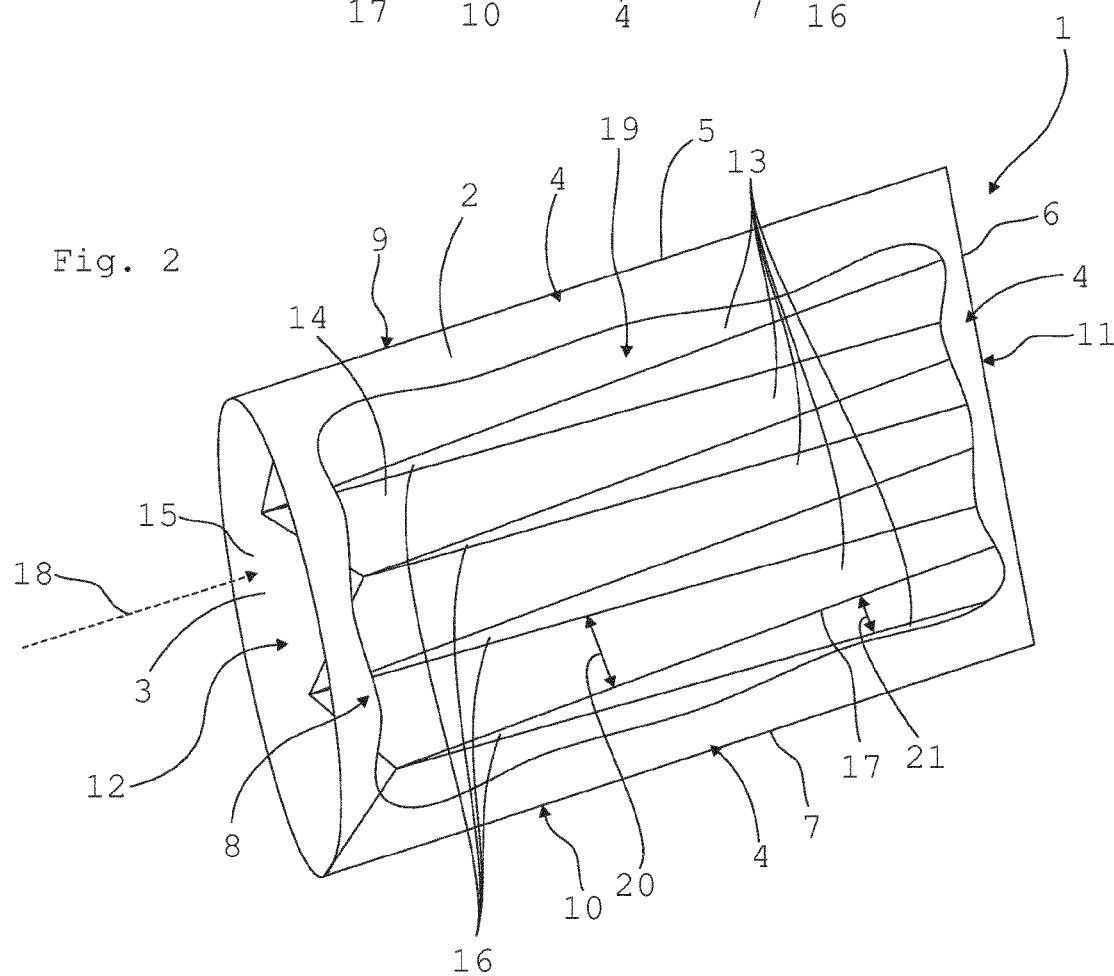
FIG. 2 shows a schematic sectional view of the filter bag shown in FIG. 1.

FIGS. 1 and 2 show a schematic top view and a sectional view of a filter bag 1. The filter bag 1 has two abutting side parts 2 and 3, which are welded to one another in side edge portions 4 on three sides, 5,6 and 7 of the side parts 2 and 3. In this way, the side parts 2 and 3, which are welded together, form a pocket 8 having two opposite side edges 9 and 10, a bottom edge 11 and an opening 12 opposite said bottom edge 11.

In the representation shown in FIG. 2, the side part 2 is shown in sections.

Inside the pocket 8 are located several webs 13 made from a flexible material web 14, where the webs 13 connect the side parts 2 and 3 to each other and are orientated to run from an opening side 15 of the filter bag 1 in the direction of the bottom edge 11.

The flexible material web 14 is alternately connected to one of the side parts 2 and 3 in staggered weld portions 16. The weld portions 16 are designed in a V-shape and are delimited in each case by two adjacent V-shaped web welds 17, where the web welds 17 run longitudinally to a direction of flow 18, in which air flows through the filter bag 1 in its installed position. In the weld portions 16, the flexible material web 14 is connected in each case exclusively either to the side part 2 or the side part 3. The figures identify, in each case by a reference, one web weld 17 as an example.

The webs 13 are formed by web portions 19 of the flexible material web 14, where the web portions 19 in each case, run between two adjacent weld portions 16 in a zig-zag pattern. One web portion 19 is again characterized as an example by a reference in the figures.

A web portion width 20, which is defined by a length of the respective web portion 19 between the side parts 2 and 3, decreases from the opening side 15 in the direction of the bottom edge 11 because of the V-shaped design of the weld portions 16. A weld portion width 21 of the weld portions 16 on the other hand, increases from the opening side 15 in the direction of the bottom edge 11. Because of the distance progression of the side parts 2 and 3 in relation to one another and prescribed in this way, in the case of the filter bag 1 shown in FIGS. 1 and 2, a basic, almost square area of the side parts 2 and 3 could be developed in order to enlarge an effective filter area.

Figure 3:
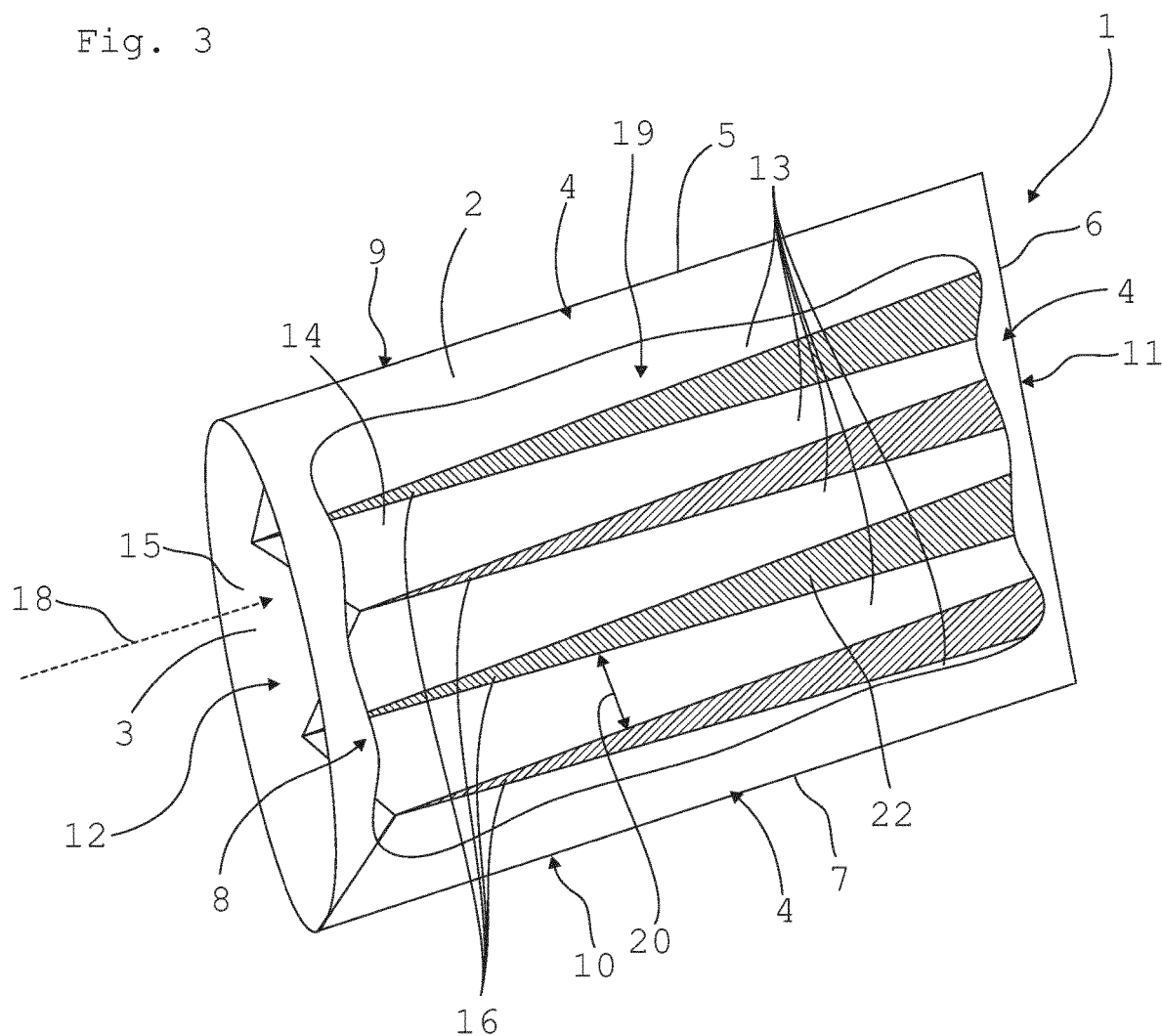
FIG. 3 shows a schematic sectional view of the filter bag with a V-shaped weld portion formed by a V-shaped web weld.

FIG. 3 schematically illustrates a section of a filter bag 1, where the filter bag shown in FIG. 3 differs from the filter bags 1 in FIGS. 1 and 2 in that the V-shaped weld portions 16 are formed in each case by V-shaped web welds 22. The V-shaped web welds 22 are shown in different shading in order to make clear that the flexible material web 14 is alternately connected in weld portions 16 to the side part 2 and side part 3.

The invention claimed is:

1. A filter bag for pocket air filters having two abutting side parts which are made of an air-permeable filter material that is weldable by ultrasound, wherein the side parts are continuously welded to one another in side edge portions on three sides of the side parts, so that by way of two side parts welded to each other, a pocket having two opposite side edges, a bottom edge and an opening opposite said bottom edge, is formed, wherein in the pocket three or more webs are formed from a flexible material web, wherein the webs join together the side parts and extend from an opening side of the filter bag towards the bottom edge, wherein the flexible material web is alternately connected to the side parts in staggered weld portions, the weld portions being delimited by at least one weld longitudinally to the direction of flow, so that the flexible material web is connected to the weld portions in a zig-zag pattern, wherein the webs are formed by web portions of the flexible material web and the web portions run, in each case, between two adjacent weld portions, by which the flexible material web is connected to two opposite side parts, wherein, in each case, a web portion width of the web portions defined by one length of a web portion between the side parts decreases from the opening side to the bottom edge, and wherein one weld portion width of at least one weld portion increases from the opening side in the direction of the bottom edge.

2. The filter bag according to claim 1, characterized in that at least one weld portion is developed as a V-shape, so that the weld portion width of the at least one weld portion increases from the opening side in the direction of the bottom edge.

3. The filter bag according to claim 2, characterized in that the V-shaped weld portion is formed by a V-shaped web weld, where one web weld width of the web weld increases from the opening side in the direction of the bottom edge.

4. The filter bag according to claim 2, characterized in that the V-shaped weld portion is formed by two adjacent web welds, where the web welds are so arranged that a space between the web welds increases from the opening side in the direction of the bottom edge.

5. The filter bag according to claim 1, characterized in that the weld portion width increases linearly along the weld portion from the opening side in the direction of the bottom edge.

6. The filter bag according to claim 1, characterized in that the weld portion width increases exponentially along the weld portion from the opening side in the direction of the bottom edge.

7. The filter bag according to claim 1, characterized in that the web portion width of at least one web portion decreases continuously to zero.

8. The filter bag according to claim 1, characterized in that the flexible material web is air-permeable.

* * * * *